US006751384B2

(12) United States Patent
Thomas et al.

(10) Patent No.: US 6,751,384 B2
(45) Date of Patent: Jun. 15, 2004

(54) METHOD AND APPARATUS FOR LASER PROTECTION OF PHOTOSENSITIVE MATERIAL

(75) Inventors: Nils I. Thomas, Roanoke, VA (US); Rudolph G. Benz, Daleville, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 388 days.

(21) Appl. No.: 09/884,479

(22) Filed: Jun. 20, 2001

(65) Prior Publication Data

US 2002/0197034 A1 Dec. 26, 2002

(51) Int. Cl.⁷ ................................................. G02B 6/04
(52) U.S. Cl. ....................................................... 385/120
(58) Field of Search .......................... 385/116–121, 30, 385/24, 39, 126

(56) References Cited

U.S. PATENT DOCUMENTS 6,487,351 B1 * 11/2002 Cryan et al. ................. 385/120

* cited by examiner

Primary Examiner—Son V. Nguyen
(74) Attorney, Agent, or Firm—Edell Shapiro & Finnan LLC; Martin Abramson

(57) ABSTRACT

A fiber optic faceplate for protecting photosensitive material from high light levels which comprises an optical structure which optically acts like a solid window at low light levels, but which at least one of attenuates or diffuses light incident on the photocathode as a function of light amplitude. A method of operation and of manufacturing the faceplate, and devices incorporating the faceplate are also disclosed.

31 Claims, 3 Drawing Sheets

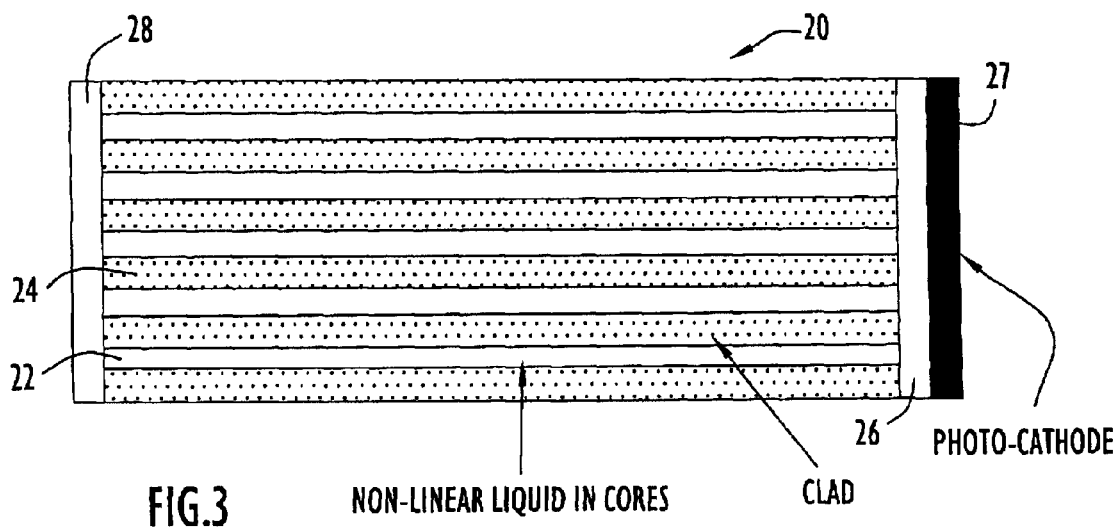
FIG.3  NON-LINEAR LIQUID IN CORES    CLAD    PHOTO-CATHODE
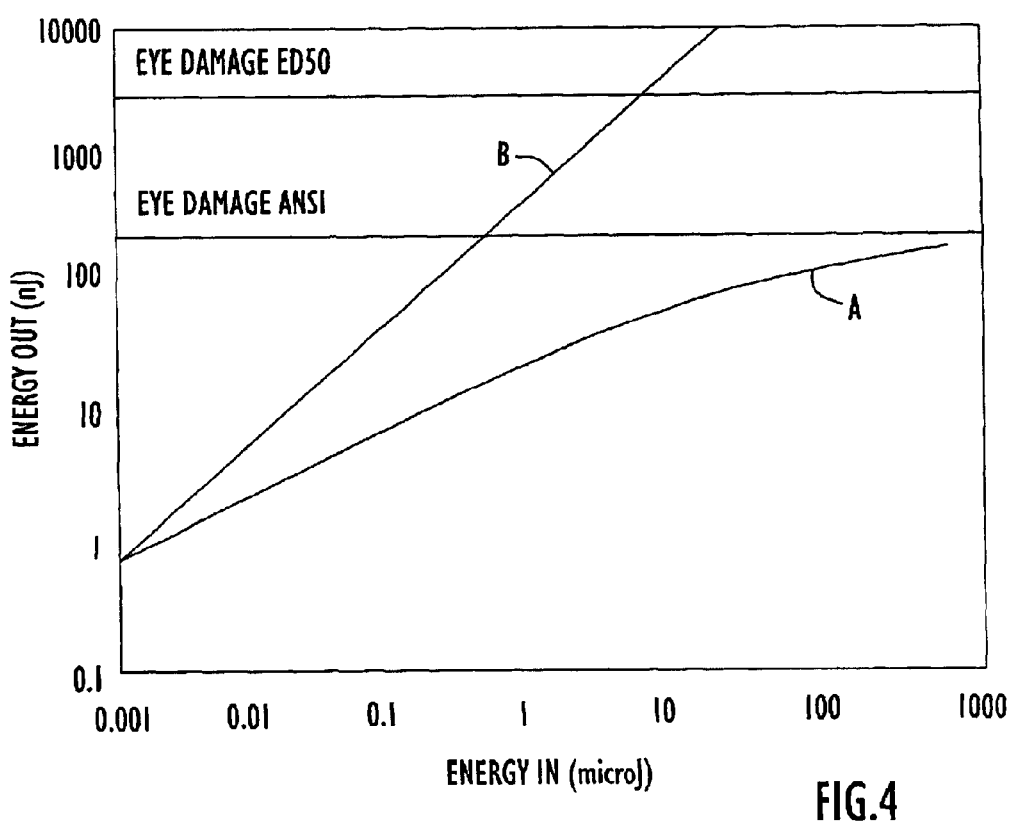
FIG.4

METHOD AND APPARATUS FOR LASER PROTECTION OF PHOTOSENSITIVE MATERIAL

FIELD OF THE INVENTION

The present invention is directed to a method and apparatus for protecting photosensitive material against damage from high light levels, as may be caused by lasers.

BACKGROUND OF THE INVENTION

Photosensitive material is vulnerable to damage from high light levels. In some instances, the high light levels, particularly from lasers, may be intentionally produced by an adversary to damage equipment which utilizes photosensitive material.

There are many uses for photosensitive material, which for example include a photocathode for an image intensifier which may be used in a night vision device, an array of photodetectors in a video camera or other imaging device, and film in a photographic camera. While such use and others for photosensitive material are encompassed by the present invention, it finds particular application for the protection of a photocathode in an image intensifier device.

Image intensifiers are used for amplifying low light images and are employed, for example, in night vision goggles, security cameras, and medical instruments.

An image intensifier tube is typically comprised of a photocathode which is attached to a glass input faceplate or window, an electron amplifier, which is typically a microchannel plate, and a converter for converting amplified electrons to light, which is typically a phosphor screen. In the operation of the device, light including infrared (IR) is fed through the window to the photocathode. The photocathode converts the light including IR to electrons, and the electrons are amplified by the microchannel plate. Finally, the amplified electrons are incident on the phosphor screen where they create a visible image.

Image intensifiers can be very sensitive to laser damage, which arises from the laser energy being focused on the photocathode or microchannel plate. A prior art approach to protection of image intensifiers was to use a faceplate comprised of a fiber optic bundle. That is, if a solid glass faceplate is used, the objective lens focuses a small spot on the faceplate having concentrated energy which can damage the photocathode. However, when fiber optics are used in place of solid glass, the energy is distributed over a larger spot on the photocathode, and is not as damaging. This is because the small spot which is focused by the objective on the input end of the fiber faceplate is somewhat larger than the diameter of one fiber, and typically covers parts of several fibers. Even if the spot covers only a small portion of a fiber at the input end, it is emitted from the entire diameter of the fiber at the output end, so the light spot is enlarged over the photocathode.

Even though fiber optic faceplates have found use in protecting photocathodes, there are performance, integration and manufacturing disadvantages associated with their use. As to performance, the resolution and modulation transfer function (MTF) of a fiber optic tube is less than a glass tube. This is because the fibers are discrete sampling devices, and inherently have lower resolution than non-sampling devices. When several sampling devices are overlapped together, the resolution drops.

The integration disadvantages stem from the fact that the customer's desire is to have a tube which is laser hardened, but which is form fit and functionally identical to the tubes presently fielded in night vision equipment. However, such equipment was designed around glass faceplate tubes. Thus, fiber optic tubes require that the equipment housing be replaced to allow for the longer optical length of a fiber optic tube, and the objective lenses need to be replaced, as these were designed to function properly with a glass faceplate. When the glass faceplate is replaced with a fiber optic faceplate the lens has poorer MTF and thereby the device resolution and contrast are reduced. Thus, a fiber optic faceplate tube is not form fit and function for most night vision device applications.

The manufacturing problems are due to the glass characteristics. Fiber optics are usually made of glasses of two different coefficient of expansion. Due to this, a gallium arsenide photocathode layer can give a visual appearance in the tube as though a bad paint brush had been used to deposit the layer, giving streaks, which in common parlance are called "brush lines".

SUMMARY OF THE INVENTION

It is therefore an object of the invention to provide an improved faceplate for photosensitive material, as well improved devices which incorporate such faceplate.

It is a further object of the invention to provide an improved method for protecting photosensitive material.

It is still a further object of the invention to provide an improved method of manufacturing.

In accordance with an aspect of the invention, a pseudo fiber optic faceplate is provided for protecting photosensitive material from high light levels which comprises an optical structure which optically acts like a solid window at normal light levels, but which at least one of attenuates or diffuses the light incident on the photocathode as a function of inputted light amplitude.

Thus, operational and integration advantages of a fiber faceplate can be achieved, while protection of the photosensitive material is afforded.

Other aspects of the invention will become evident by referring to the following description and claims.

BRIEF DESCRIPTION OF THE DRAWINGS

The invention will be better understood by referring to the accompanying drawings, wherein:

FIG. 3 shows an embodiment of the present invention.

FIG. 4 shows a graph of an input/output function for a non-linear optical material.

DETAILED DESCRIPTION OF PREFERRED EMBODIMENTS

Figure 1:
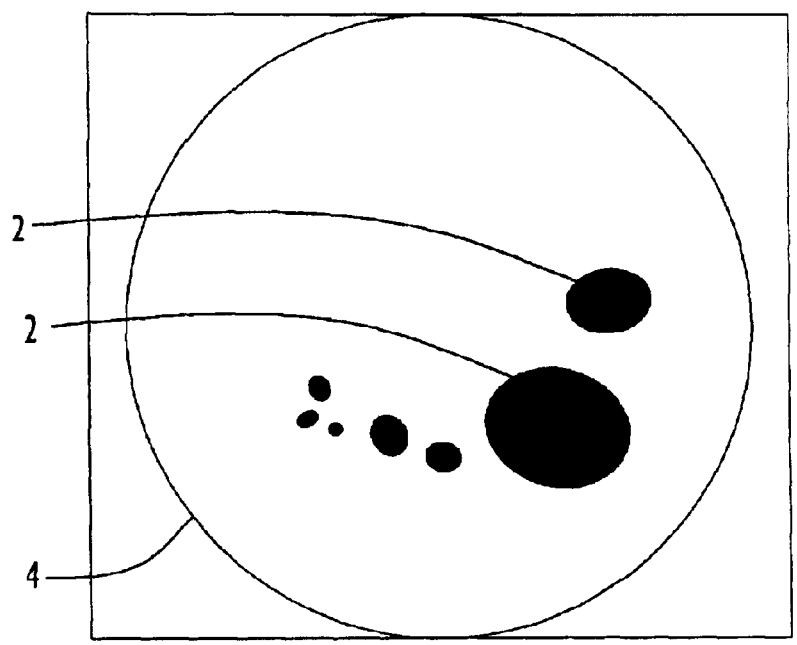
FIG. 1 shows a typical pattern of laser damage to an image intensifier tube.

Referring to FIG. 1, a typical pattern of laser damage which may be inflicted upon an image intensifier tube is depicted. The dark spots 2 are burns in the photocathode 4 which render the tube inoperative or ineffective. As an example of how such damage occurs, the image intensifier tube may be incorporated in a night vision device which may be deployed by the military. The laser may be part of the weaponry used by an adversary to render night vision devices ineffective.

Figure 2:
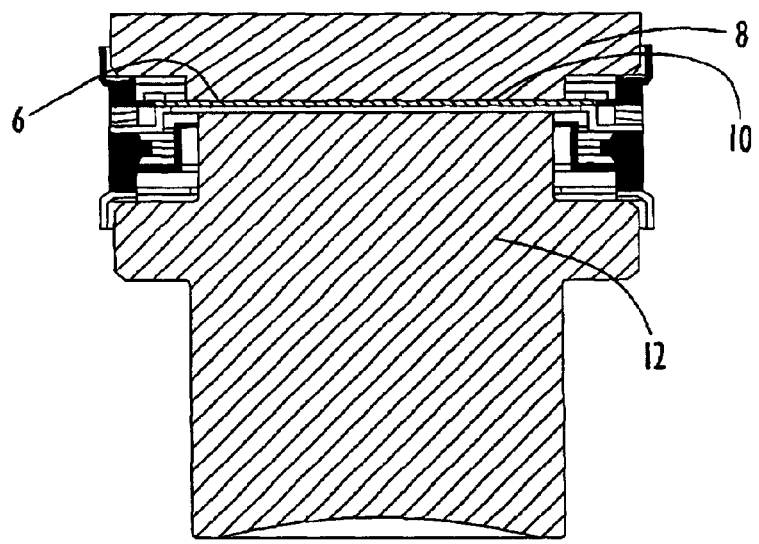
FIG. 2 shows the structure of a prior art image intensifier tube.

FIG. 2 shows the structure of a typical prior art image intensifier tube. Referring to the Figure, photocathode 6 is adhered to window or faceplate 8, which is a solid glass block. Light to be amplified (including IR) is focused through the window 8 onto the photocathode. The photocathode 6 is made of gallium arsenide or some other photoemissive material, and emits electrons in response to the light incident on it. The emitted electrons are amplified in microchannel plate 10, which is an assembly of hollow glass pores with electrical conductive and amplification properties. Finally, the amplified electrons are reconverted to light by the phosphor screen assembly 12.

As discussed in detail above, a prior art approach to preventing laser damage is to replace the solid faceplate with a fiber optics faceplate. Briefly, the theory is that the spot which is focused by an objective lens on the faceplate is slightly larger than the diameter of a single fiber, so that the light will be spread over several fibers and thus be less concentrated on the photocathode than if a solid glass faceplate were used. However, as explained above, the use of a fiber optics faceplate entails numerous operational, integration and manufacturing disadvantages.

The approach of the present invention is to use fiber optics technology, but in such a way that the faceplate acts like a solid glass faceplate at normal light input levels.

FIG. 3 shows an embodiment of the invention. The structure is a faceplate fronting a photocathode, wherein the faceplate is comprised of a fused fiber optic bundle, where the cores of individual fibers have been replaced with a non-linear optical material. The non-linear optical material has the property of changing at least one of its optical transmission or index of refraction as a function of the amplitude of the light input. Over a range of normal light levels, neither the optical transmission nor the index of refraction materially changes.

Referring to FIG. 3, faceplate/photocathode structure 20 is depicted, which is comprised of a fused fiber optic bundle. Each individual fiber has a core 22 comprising a member which is typically cylindrical in shape, which is interior to and surrounded by cladding 24. In ordinary fiber optics, which are well known to those in the art, both the core and cladding are made of glass, but the index of refraction of the core is higher than the index of refraction of the cladding.

In the structure of FIG. 3, the index of refraction of the non-linear optical material of the cores is arranged to be substantially the same as the index of refraction of the cladding. When the two indices of refraction are matched, the fiber optic bundle acts like a clear glass window and not like fiber optics. Additionally, the end caps 26 and 28 are made of the same glass as the cladding, so the whole faceplate acts like a glass window. The photocathode 27 is bonded to end cap 26.

The non-linear optical materials have an active component which is typically dissolved in a liquid, so that the material which comprises the cores of the fibers is a liquid. The term non-linear optical material as used herein refers both to the active material and to the active material-containing liquid.

As mentioned, the non-linear optical material is selected from that class of materials having the property that at least one of the optical transmission and index of refraction changes as a function of light amplitude. More specifically, the optical transmission of the material decreases with increasing light amplitude while the index of refraction may either increase or decrease depending on the particular material which is selected. Examples of materials which can be used as the active material are carbon black and organic cholesterics, which would be dissolved in a liquid, which for example could be toluene, methanol, or isopropenol. It is to be understood that these materials are sample solvents and the invention described is not dependent on the use of these specific materials.

A graph of energy outputted vs. energy inputted for an organic cholesteric is depicted by Curve A in FIG. 4. A corresponding curve for carbon black has a similar shape. Since optical transmission is defined as energy out divided by energy in, it is seen that the transmission decreases at higher light input values, above a threshold level. The slope of curve A is not a straight line, hence the designation "non-linear" optical material, while the slope of Curve B, which is a straight line, is representative of a linear optical material. Also, it should be noted that while in the example depicted the transmission of the non-linear material may be somewhat less than that of the linear material for all light input values, this in not necessarily the case.

Although the non-linear material as defined herein has the property of having at least one of its optical transmission and index of refraction change as a function of light amplitude, in the preferred embodiment, both of these parameters can change simultaneously with light amplitude. The index of refraction may either increase or decrease with increasing light amplitude, depending on the particular material used. If the index of refraction increases, the structure shown in FIG. 3 acts like a fiber optic bundle at high light levels and spreads the somewhat larger light spot over the photocathode. On the other hand, if the index of refraction decreases, then the focus position changes to be behind the cathode with the result being the same (diffusion of the light on the cathode). Light is now refracted away from the core into the cladding instead of the normal fiber optic operation where total internal reflection takes place.

As mentioned above, the index of refraction of the non-linear material is arranged to be substantially the same as the index of refraction of the fiber cladding at normal light levels. However, above a threshold level of input light, the index of refraction changes, as detailed above.

The provision of a non-linear optical material in the preferred embodiment which changes both optical transmission and index of refraction provides a greater degree of protection that if only one parameter changes. For example, a fiber optic faceplate can decrease the damage level by approximately a factor of ten (10), while a non-linear material which changes optical transmission as well as index of refraction can provide protection up to several orders of magnitude.

Figure 5:
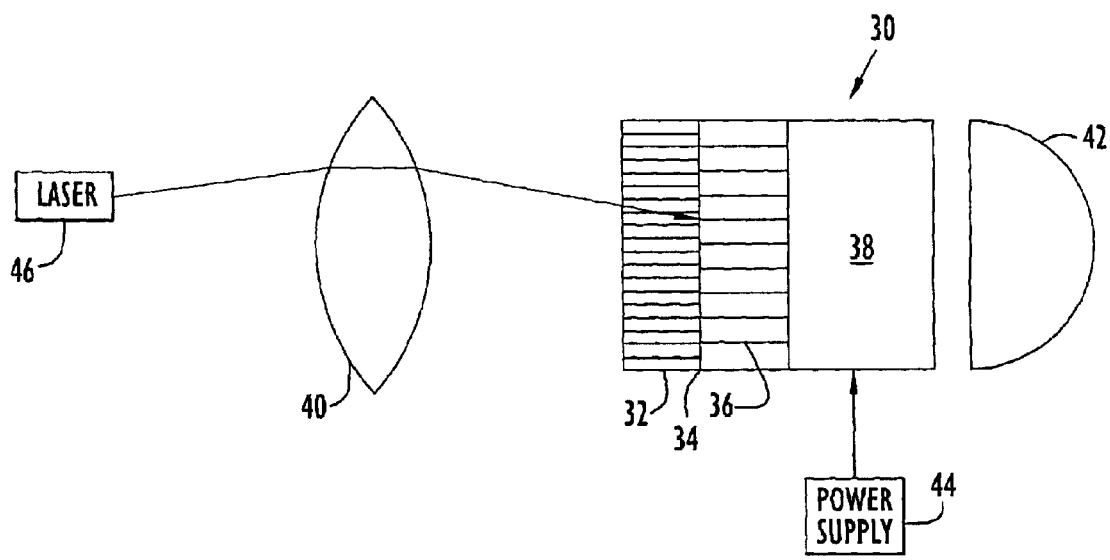
FIG. 5 shows a night vision device which utilizes the present invention.

FIG. 5 shows an image intensifier as modified in accordance with the present invention which is incorporated in a night vision device, such as night vision goggles. Image intensifier 30 includes faceplate 32 constructed as taught herein, to which photocathode 34 is adhered. Also present in the image intensifier are microchannel plate 36 and phosphor screen 38 as previously described.

In addition to the image intensifier, the night vision device includes objective lens means 40 and eyepiece 42, power supply 44 being present for applying required voltage levels to the image intensifier. The night vision device is protected against damage which would otherwise be caused by laser 46.

Additionally, the image intensifier tube can be designed to be form fit and function to presently fielded night vision equipment. Because the faceplate functions as a glass window at normal light levels, the performance and integration disadvantages heretofore discussed in connection with other fiber optic image intensifier tubes are overcome.

While the invention has been illustrated in connection with an embodiment employing the usual fiber optics as a starting point, other structures are possible and are within the scope of the invention. For example, an alternative structure may start with a solid glass window of material having the desired index of refraction for fiber optic cladding. A large number of small diameter elongated (length being some multiple of diameter) holes could then be drilled or etched in the window, and the holes filled with members of non-linear optical material.

Also, as has been mentioned, the invention is for protecting any type of photosensitive material, only one example of which is a photocathode. A photosensitive material is one which changes electrically or chemically upon being illuminated with light (including ultraviolet and infrared).

Figure 6:
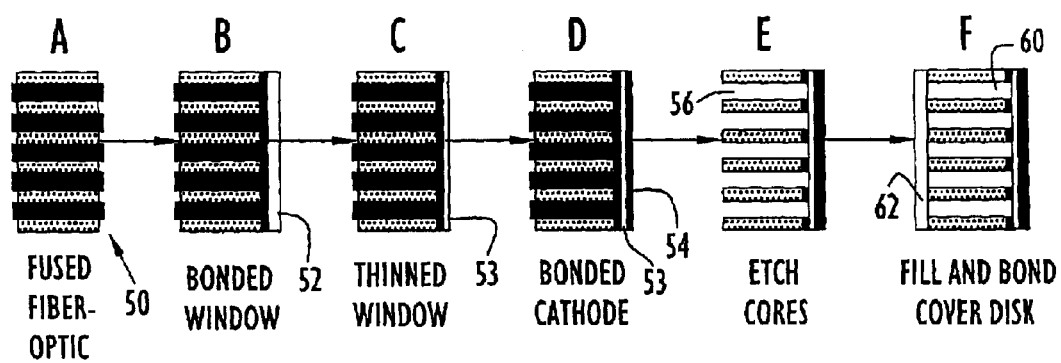
FIG. 6 depicts an embodiment of a manufacturing method in accordance with the present invention.

A method according to the invention, of making the faceplate/photocathode structure depicted in FIG. 3 as deployed in an image intensifier tube, will now be described in connection with FIG. 6.

Referring to the Figure, reference number 50 shows a fused fiber optic bundle, which is the starting point of the method shown at step A. A cover plate 52 made of the same glass as the fiber cladding is then thermally bonded to an end of the fiber optic bundle, resulting in the structure shown at step B.

The cover plate may then be thinned, as by grinding it, as shown in step C to produce thinned cover plate 53. A photocathode 54 is bonded onto the cover plate with transparent cement at step D and is processed into a tube according to normal procedures. After the tube has been sealed, the core glass is etched away, at step E, for example with the use of hydrochloric or hydrofluoric acid, leaving openings 56. The core glass is made of a material, known to those skilled in the art, which is preferentially etched in comparison to the cladding, so merely dipping the structure in an etching bath will effect the desired etching. The openings 56 are then filled with replacement optical material 60 at step F (e.g. non-linear optical material as disclosed herein), and a cover glass 62 is bonded to the other end of the faceplate with transparent cement.

Manufacturability of tubes with the non-linear materials is robust. By permitting flexibility in core glass types, the coefficient of thermal expansion can be matched to the coefficient of thermal expansion of the cladding, cover plates, and photocathode, thus reducing cathode stresses and giving a better image than conventional fiber optics. Also, by etching the cathode after the tube has been sealed, problems involving temperature intolerance of replacement optical materials to the necessary vacuum processing temperatures required by image tubes are obviated. For example, non-linear optical materials usually disintegrate at temperatures less than 200 C. while the vacuum processing temperatures are about 350 C. In fact, until this invention, there has been no practical way of implementing such materials in tubes due to the vacuum requirements and temperatures. The present invention allows for both to be satisfied by etching the fiber optic and filling it with the optical materials after the tube has been sealed.

There thus has been described an improved faceplate for photosensitive materials, improved devices incorporating such faceplate, and a method for making these. It should be understood that while the invention has been described in connection with preferred and illustrative embodiments, variations will occur to those skilled in the art, and the invention to be covered is defined in the claims which are appended hereto.

We claim:

1. An optical faceplate for photosensitive material, comprising a plurality of first members of a first optical material which are interior to a second optical material which surrounds the first members, wherein the first optical material is a non-linear optical material which has an index of refraction which is substantially the same as the index of refraction of the second optical material at a normal level of light input expected to be encountered by the faceplate but which has the property of substantially changing at least one of its index of refraction and optical transmission as a function of the amplitude of light which is received by the faceplate.

2. The faceplate of claim 1 wherein the first members are elongated.

3. The faceplate of claim 2 wherein the first members surrounded by the second optical material comprise a fiber optic bundle, wherein cores of individual fibers are the first members and cladding of individual fibers is the second optical material.

4. The faceplate of claim 3 in combination with a photocathode, wherein the photosensitive material is material of which the photocathode is comprised.

5. The faceplate of claim 3 in combination with an image intensifier tube having a photocathode, wherein the photosensitive material is material of which the photocathode is comprised.

6. A faceplate for protecting photosensitive material from high light input levels, comprising a fiber optic bundle in which individual fiber optics are comprised of cladding having a first index of refraction and a core comprised of non-linear optical material having an index of refraction which is substantially the same as the first index of refraction at a normal light level expected to be encountered by the faceplate, wherein the non-linear optical material has the property of substantially changing its index of refraction as a function of the amplitude of light which is received by the faceplate.

7. The faceplate of claim 6 wherein the non-linear optical material further has the property of substantially decreasing its optical transmission with increasing amplitudes of light received by the faceplate.

8. The faceplate of claim 7 in combination with an image intensifier tube having a photocathode, wherein the photosensitive material is material of which the photocathode is comprised.

9. A pseudo fiber optic faceplate for protecting photosensitive material from high light levels, comprising fiber optic bundle means for optically acting like a solid window at normal light levels, but for at least one of attenuating or diffusing a light spot inputted thereto at light levels above a predetermined threshold level.

10. The faceplate of claim 9 wherein the fiber optic bundle means comprises means for attenuating a light spot inputted thereto at light levels above a predetermined light level.

11. The faceplate of claim 9 wherein the fiber optic bundle means comprises means for diffusing a light spot inputted thereto at light levels above a predetermined threshold level.

12. The faceplate of claim 11 wherein the fiber optic bundle means comprises means for both attenuating and diffusing a light spot inputted thereto at light levels above a predetermined threshold level.

13. The faceplate of claim 11 wherein individual fibers of the fiber optic bundle means are comprised of clad glass and core glass, and wherein the means for diffusing the inputted light spot comprises means for changing the index of refraction of the core glass.

14. An image intensifier tube, comprising:
   a faceplate having a photocathode disposed thereon;
   an electron amplifier; and
   a converter for converting amplified electrons to visible light;
   wherein the faceplate is a fiber optic bundle in which individual fiber optics are comprised of cladding having a first index of refraction and a core comprised of optical material having an index of refraction which at a normal light level expected to be encountered by the faceplate is substantially the same as the first index of refraction.

15. The image intensifier tube of claim 14 wherein the cores of individual fibers are made of non-linear optical material having the property of changing at least one of its optical transmission and index of refraction as a function of the amplitude of light received by the image intensifier.

16. The image intensifier tube of claim 15 wherein the faceplate includes a first transparent cover plate at a first end of the fiber optic bundle between the fiber optic bundle and the photocathode, wherein the cover plate is made of material having substantially the same index of refraction as the cladding.

17. The image intensifier tube of claim 16 wherein the first cover plate is made of material having substantially the same coefficient of thermal expansion as the material of which the photocathode is comprised.

18. The image intensifier of claim 16 further including a second transparent cover plate at a second end of the fiber optic bundle opposite the first end.

19. The image intensifier tube of claim 14 wherein the first index of refraction is substantially the same as the index of refraction of material of which the photocathode is comprised.

20. The image intensifier of claim 19 wherein the cathode faceplate includes a first transparent cover plate at a first end of the fiber optic bundle between the fiber and optics and the photocathode, wherein the cover plate is made of material having an index of refraction which is substantially the same as the first index of refraction.

21. The image intensifier tube of claim 15 wherein the non-linear optical material has the property of changing its index of refraction as a function of the amplitude of light received by the image intensifier.

22. The image intensifier tube of claim 21 wherein all of the fiber optics in the fiber optic bundle are comprised of cladding having a first index of refraction and a core comprised of non-linear optical material having the property of changing its index of refraction as a function of the amplitude of light received by the image intensifier.

23. The image intensifier tube of claim 15 in combination with;
   objective lens means for imaging light on the image intensifier tube, and an eyepiece for viewing an image produced by the image intensifier tube.

24. A method of making an assembly comprising a composite pseudo fiber optic faceplate and photocathode, comprising the steps of,
   providing a fused fiber optic bundle comprised of individual fiber optics including cladding of material having a first index of refraction and an etchable core of material having a second index of refraction, the fiber optic bundle having first and second ends,
   bonding a transparent window to the first end of the fiber optic bundle,
   bonding a photocathode to the transparent window,
   etching the core material of the individual fiber optics away, and
   replacing the core material of the individual fiber optics with replacement optical material.

25. The method of claim 24 wherein the steps of bonding a transparent window and bonding a photocathode to the transparent window are performed before the etching step.

26. The method of claim 25 including the step of forming a tube to the photocathode and sealing the tube, which step is performed before the etching step.

27. The method claim 26 wherein the coefficient of thermal expansion of the replacement optical material, of the cladding material, and of the window material are matched to the coefficient of thermal expansion of the material of which the photocathode is comprised.

28. The method of claim 27 further including the step of thinning the transparent window before the photocathode is bonded thereto.

29. The method of claim 24 further including the step of bonding a cover plate to the second end of the fiber optic bundle.

30. The method of claim 24 wherein the replacement optical material is non-linear optical material having an index of refraction at normal light levels which is substantially the same as the first index of refraction.

31. The method of claim 26 wherein the replacement optical material is non-linear optical material having an index of refraction at normal light levels which is substantially the same as the first index of refraction.

* * * * *